United States Patent
Smits et al.

(10) Patent No.: US 12,540,116 B2
(45) Date of Patent: Feb. 3, 2026

(54) PROCESS FOR THE PREPARATION OF 5-CHLORO-3-ALKYLSULFANYL-PYRIDINE-2-CARBOXYLIC ACID AMIDES AND CARBOXYLATES

(71) Applicant: SYNGENTA CROP PROTECTION AG, Basel (CH)

(72) Inventors: Helmars Smits, Stein (CH); Mattia Riccardo Monaco, Stein (CH); Raphael Dumeunier, Stein (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 740 days.

(21) Appl. No.: 17/908,375

(22) PCT Filed: Mar. 3, 2021

(86) PCT No.: PCT/EP2021/055400
§ 371 (c)(1),
(2) Date: Aug. 31, 2022

(87) PCT Pub. No.: WO2021/175959
PCT Pub. Date: Sep. 10, 2021

(65) Prior Publication Data
US 2023/0091373 A1    Mar. 23, 2023

(30) Foreign Application Priority Data
Mar. 4, 2020  (EP) .................................... 20160977

(51) Int. Cl.
*C07D 213/81* (2006.01)
*C07D 213/79* (2006.01)

(52) U.S. Cl.
CPC ......... *C07D 213/81* (2013.01); *C07D 213/79* (2013.01)

(58) Field of Classification Search
CPC ........................... C07D 213/81; C07D 213/79
See application file for complete search history.

(56) References Cited

U.S. PATENT DOCUMENTS

| 2015/0189880 A1 | 7/2015 | Maehata et al. |
| 2015/0313234 A1* | 11/2015 | Takahashi .............. A01N 43/76 |
| | | 546/261 |

FOREIGN PATENT DOCUMENTS

| CN | 104507911 A | 4/2015 |
| CN | 104903303 A | 9/2015 |
| EP | 2881386 A1 | 6/2015 |
| JP | 2019081800 A | 5/2019 |
| WO | 2019065568 A1 | 4/2019 |

OTHER PUBLICATIONS

Written Opinion of the International Searching Authority and International Search Report for International Application No. PCT/EP2021/055400, mailed Apr. 15, 2021.

* cited by examiner

*Primary Examiner* — Timothy R Rozof
(74) *Attorney, Agent, or Firm* — BakerHostetler; Toni-Junell Herbert

(57) ABSTRACT

A process for the preparation of compound of formula (I) is provided: where $R_1$ and $R_2$ are as defined in the description.

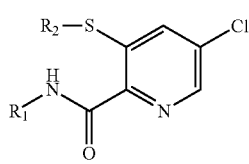

20 Claims, No Drawings

PROCESS FOR THE PREPARATION OF 5-CHLORO-3-ALKYLSULFANYL-PYRIDINE-2-CARBOXYLIC ACID AMIDES AND CARBOXYLATES

CROSS-REFERENCE TO RELATED APPLICATIONS

This application is a 371 National Stage application of International Application No. PCT/EP2021/055400 filed Mar. 3, 2021, which claims priority to EP 20160977.3, filed Mar. 4, 2020, the entire contents of these applications are hereby incorporated by reference.

The present invention relates to the preparation of 5-chloro pyridine-2-carboxylic acid amides and carboxylates with 3-sulfur containing substituents that are useful as intermediates for the preparation of agrochemicals.

More particularly, the present invention relates to 5-chloro pyridine-2-carboxylic acid amide of formula I and to a process for preparation thereof

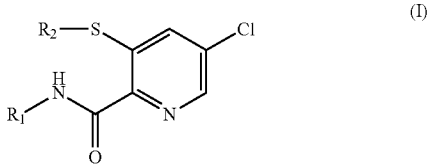

(I)

wherein $R_1$ is hydrogen, $C_1$-$C_4$alkyl, $C_1$-$C_4$hydroxyalkyl, $C_3$-$C_7$cycloalkyl, aryl or optionally substituted heteroaryl; preferably $R_1$ is $C_1$-$C_4$alkyl or hydrogen, more preferably $R_1$ is hydrogen; $R_2$ is $C_1$-$C_4$alkyl; preferably $R_2$ is ethyl, or an agrochemically acceptable salt of a compound of formula (I).

This invention also relates to 5-chloro pyridine-2-carboxylic acid and its salts of formula II and to a process for preparation thereof

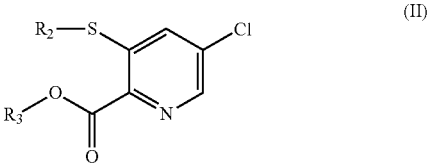

(II)

wherein $R_3$ is H, Li, Na or K; $R_2$ is $C_1$-$C_4$alkyl

Certain 5-halo-pyridine-2-carboxylic acids with 3-alkylsulfanyl substituents (and certain corresponding esters, amides and salts thereof) are useful intermediates for the preparation of biologically active compounds in the agrochemical industries as previously described, for example, in: WO 2016/005263, WO 2016/030229, WO 2016/059145, WO 2016/096584, WO 2016/104746, WO 2018/059145, WO 2019/065568 and JP2019081800.

The term "$C_1$-$C_4$alkyl" as used herein refers to a saturated straight-chain or branched hydrocarbon radical attached via any of the carbon atoms having 1 to 4 carbon atoms, for example, any one of the radicals methyl, ethyl, n-propyl, butyl, sec-butyl, t-butyl.

Haloalkyl groups preferably have a chain length of from 1 to 4 carbon atoms. $C_1$-$C_4$haloalkyl is, for example, fluoromethyl, difluoromethyl, trifluoromethyl, chloromethyl, dichloromethyl, trichloromethyl, 2,2,2-trifluoroethyl, 2-fluoroethyl, 2-chloroethyl, 2,2-difluoroethyl, pentafluoroethyl, 1,1-difluoro-2,2,2-trichloroethyl, 2,2,3,3-tetrafluoroethyl and 2,2,2-trichloroethyl.

Hydroxyalkyl groups preferably have a chain length of 1 to 4 carbon atoms. $C_1$-$C_4$hydroxyalkyl is, for example, methoxymethyl, methoxyethyl, ethoxymethyl, ethoxyethyl, n-propoxymethyl, n-propoxyethyl, isopropoxymethyl or isopropoxyethyl.

As used herein, the term "aryl" refers to an aromatic ring system consisting solely of carbon and hydrogen atoms which may be mono-, bi- or tricyclic. Examples of such ring systems include phenyl, naphthalenyl, anthracenyl, indenyl or phenanthrenyl; preferably phenyl.

As used herein, the term "heteroaryl" generally refers to a 5- or 6-membered monocyclic aromatic ring radical which comprises 1, 2, 3 or 4 heteroatoms individually selected from nitrogen, oxygen and sulfur. The heteroaryl radical is bonded to the rest of the molecule via a carbon atom. Examples of heteroaryl may include pyridyl, pyrimidyl, pyrrolyl, pyrazolyl, furyl, thienyl, imidazolyl, isoxazolyl, oxazolyl, thiazolyl, isothiazolyl, triazolyl, oxadiazolyl, thiadiazolyl, tetrazolyl, pyrazinyl, pyridazinyl, triazinyl, pyranyl; preferably pyridyl.

In one embodiment, heteroaryl is optionally substituted with, for example, 1 or 2 substituents selected from amino, $C_1$-$C_4$alkylamino (preferably methylamino), and $C_1$-$C_4$haloalkyl (preferably trifluoromethyl).

The term "$C_3$-$C_7$cycloalkyl" as used herein refers to 3-7 membered cycloylkyl groups such as cyclopropane, cyclobutane, cyclopentane, cyclohexane and cycloheptane.

Known synthesis of 5-halo-pyridine-2-carboxylic acids and carboxylates with 3-alkylsulfanyl substituents involve many reaction steps. For example, two routes to access the 5-bromo derivatives have been reported (route A: CN105218437; route B: US2012/0165338 or J. Org. Chem. 2009, 74, 4547-4553) and are shown in Scheme 1 ($R_1$ is H, $C_1$-$C_4$alkyl, or an alkali metal ion)

Scheme 1. Routes to 5-Br derivatives

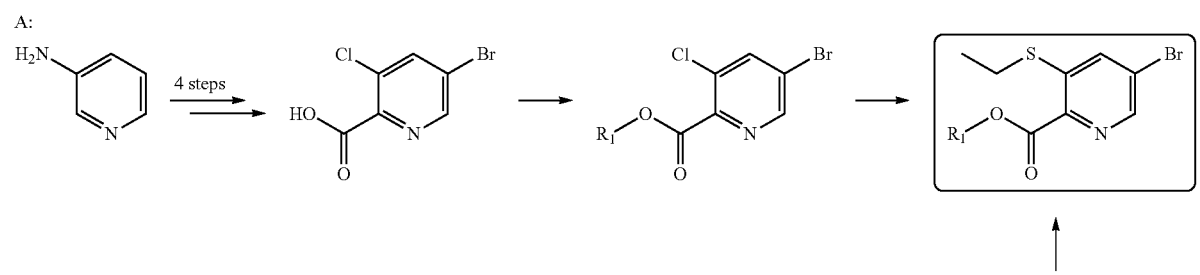

B:

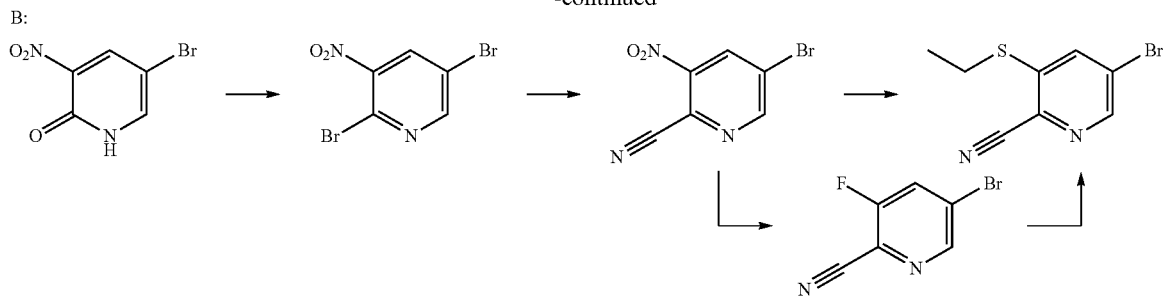

Access to the corresponding 5-iodo derivative has been reported in WO2016/104746 from commercially available 5,6-dichloronicotinic acid in seven steps as shown in Scheme 2.

compound of formula (I) wherein $R_1$ and $R_2$ are defined as previously. Compounds of structure (I) could, if desired, be hydrolyzed using standard methods to yield compounds of formula (II) wherein $R_3$ is H, Li, Na or K (Scheme 3).

Scheme 2. Route to 5-iodo derivative

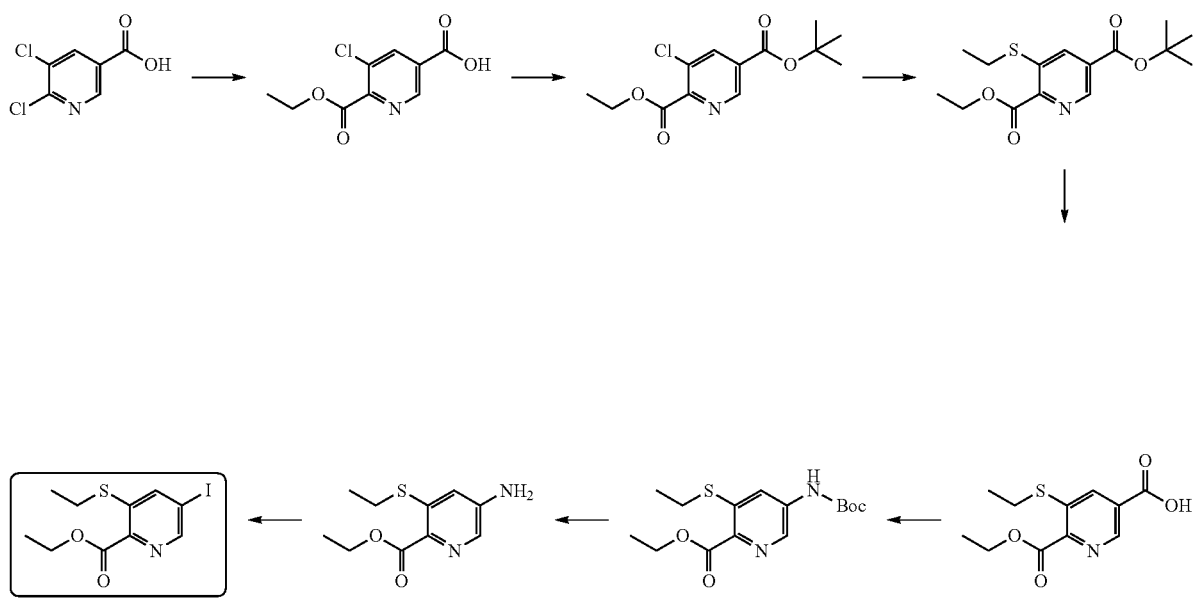

Carboxylates of formula (II) or amides of formula (II) containing a 5-chloro substituent have not been previously reported, however in principle could be prepared similarly as described above using methods well known to a person skilled in the art. Nevertheless, such long and laborious syntheses are not suitable for preparing large amount of material due to low overall yields and large amount of waste generated.

Therefore, it would be advantageous to have available a more efficient and economical route to these useful intermediates.

Amides of 3,5-dichloropyridine-2-carboxylic acid are convenient starting materials as they are easily prepared either from the commercially available 3,5-dichloropyridine-2-carboxylic acid and its esters by standard methods or from 2,3,5-trichloropyridine via aminocarbonylation. 3,5-dichloropyridine-2-carboxamide could also be prepared by semi hydrolysis of a commercially available 3,5-dichloropyridine-2-carbonitrile using standard methods. A selective displacement of chlorine in a 3-position would then yield a Scheme 3. Envisaged route to (VI) or (VII) from (VIII) or (IX)

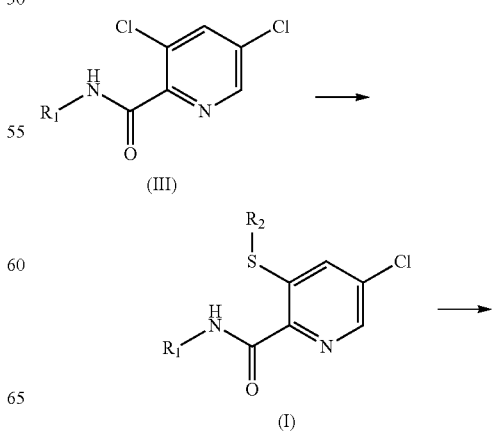

-continued

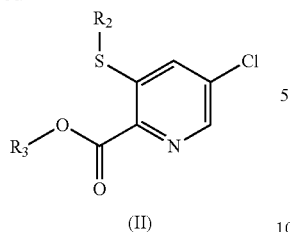

(II)

An ortho selective displacement of a halogen in a phenyl series has been reported in Synth.Comm. 1995, 899 (Scheme 4) there as an analogous transformation in picolinic acid series is unknown.

Scheme 4. Ortho selective displacement in phenyl series

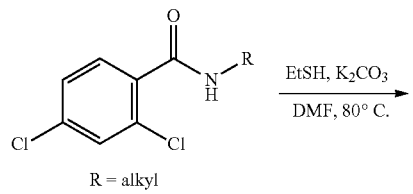

R = alkyl

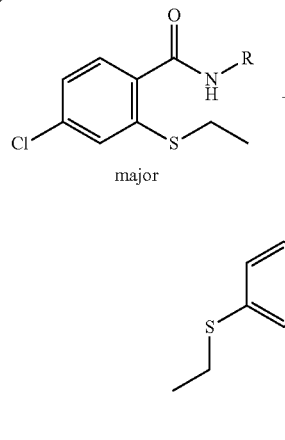

However, a direct application of reported conditions for the transformation of compounds of formula (III) to compounds of formula (I) led to very low selectivity or outright formation of the undesired isomer as the major product.

Thus, according to the present invention, there is provided a process for the preparation of compound of formula I:

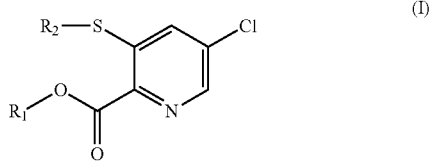

wherein $R_1$ is hydrogen, $C_1$-$C_4$alkyl, $C_1$-$C_4$hydroxyalkyl, $C_3$-$C_7$cycloalkyl, aryl or optionally substituted heteroaryl; preferably $R_1$ is $C_1$-$C_4$alkyl or hydrogen, more preferably $R_1$ is hydrogen; and $R_2$ is $C_1$-$C_4$alkyl; preferably $R_2$ is ethyl; which process comprises:

reacting a compound of formula (III)

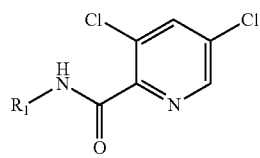

with a thiol compound $R_4$—S—$R_2$ wherein $R_2$ is as defined in formula I and $R_4$ is H or an alkali metal ion; preferably $R_4$ is H, sodium, potassium or lithium, in the presence of a suitable base, in an appropriate solvent (or diluent) having a dielectric constant less than 15; to produce a compound of formula (I) or a salt thereof

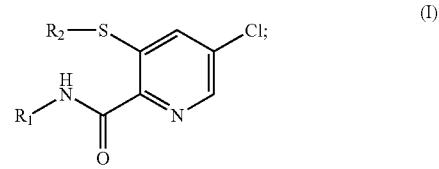

and, optionally,
hydrolyzing the compound of the formula (I) or a salt thereof under either basic or acidic conditions; to produce the compound of formula (II) where $R_2$ is $C_1$-$C_4$alkyl; preferably $R_2$ is ethyl and $R_3$ is hydrogen, sodium, potassium or lithium; preferably $R_3$ is hydrogen.

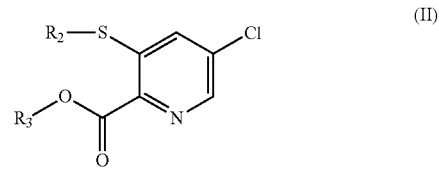

In one embodiment, $R_1$ is hydrogen, $C_1$-$C_4$alkyl, $C_1$-$C_4$hydroxyalkyl, $C_3$-$C_7$cycloalkyl, aryl or optionally substituted heteroaryl and $R_2$ is $C_1$-$C_4$alkyl; preferably $R_1$ is $C_1$-$C_4$alkyl or hydrogen and $R_2$ is ethyl; more preferably $R_1$ is hydrogen and $R_2$ is ethyl.

In another embodiment, $R_1$ is hydrogen, $C_1$-$C_2$alkyl, $C_1$-$C_2$hydroxyalkyl, $C_3$-$C_5$cycloalkyl, phenyl, pyridyl, or pyridyl which can be mono- or di-substituted by amino, methylamino or trifluoromethyl and $R_2$ is $C_1$-$C_2$alkyl; preferably $R_1$ is methyl or hydrogen and $R_2$ is ethyl.

In a further embodiment, $R_1$ is hydrogen, methyl, ethyl, phenyl, cyclopropyl, cyclopentyl, hydroxymethyl, hydroxyethyl, pyridyl or 2-(methylamino)-5-(trifluoromethyl)-3-pyridyl and $R_2$ is ethyl; preferably $R_1$ is hydrogen, ethyl, phenyl, cyclopentyl, hydroxyethyl or 2-(methylamino)-5-(trifluoromethyl)-3-pyridyl and $R_2$ is ethyl.

This process is demonstrated to be of great usefulness as it allows the synthesis of key building blocks for the preparation of agrochemicals in higher yields and with more favorable conditions with respect to previously described routes.

Surprisingly, it was found that high ortho selectivity for thiolation of 3,5-dichloropicolinic acid amides was observed in both non-protic and protic apolar solvents. In particular, it was found that the selectivity is remarkably influenced by the nature of the solvent: in solvents with high relative permittivity (i.e. DMF [dielectric constant of 36.7]), high selectivity for the "para" isomer (V) is observed, whereas in solvents with low relative permittivity (i.e. THF, pyridine, anisole . . . [dielectric constants of 7.6, 12.4, 4.3]), selective formation of "ortho" isomer (a compound of formula (I) represented by a compound of formula IV) is observed. In addition, the use of low permittivity solvents greatly minimized formation of compounds of formula (VI). This concept in shown in Scheme 5.

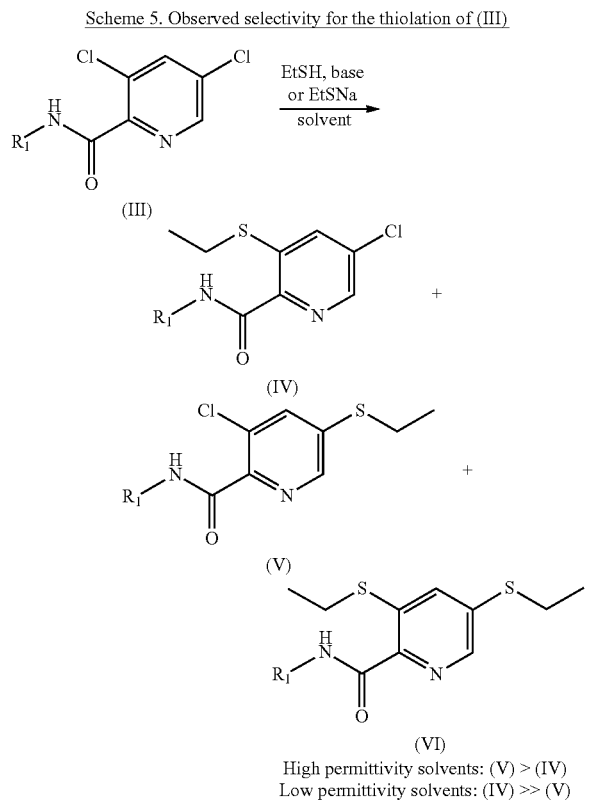

In another embodiment of the present invention, a compound of formula I represented by a compound of formula IV, or an agrochemically acceptable salt of a compound of IV where $R_1$ is as defined for a compound of formula I, is provided:

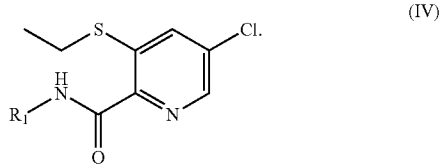

Among the compounds of formula IV there can be mentioned compounds wherein $R_1$ is hydrogen, $C_1$-$C_4$alkyl, $C_1$-$C_4$hydroxyalkyl, $C_3$-$C_7$cycloalkyl, aryl or optionally substituted heteroaryl; preferably $R_1$ is $C_1$-$C_4$alkyl or hydrogen, more preferably $R_1$ is hydrogen.

In one embodiment, $R_1$ is hydrogen, $C_1$-$C_2$alkyl, $C_1$-$C_2$hydroxyalkyl, $C_3$-$C_5$cycloalkyl, phenyl, pyridyl, or pyridyl which can be mono- or di-substituted by amino, methylamino or trifluoromethyl; preferably $R_1$ is methyl or hydrogen, more preferably $R_1$ is hydrogen.

In a further embodiment, $R_1$ is hydrogen, methyl, ethyl, phenyl, cyclopropyl, cyclopentyl, hydroxymethyl, hydroxyethyl, pyridyl or 2-(methylamino)-5-(trifluoromethyl)-3-pyridyl; preferably $R_1$ is hydrogen, ethyl, phenyl, cyclopentyl, hydroxyethyl or 2-(methylamino)-5-(trifluoromethyl)-3-pyridyl.

In a further embodiment of the present invention, a compound of formula II represented by a compound of formula IIa is provided:

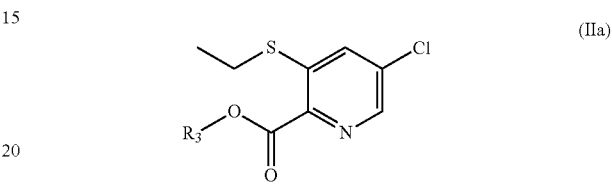

where $R_3$ is hydrogen, sodium, potassium or lithium; preferably $R_3$ is hydrogen.

Certain aspects of the process according to the invention for making compounds of formula (I) are further detailed and explained by reference to scheme 5. It will be appreciated that a compound of formula I is represented in scheme 5 by a compound of formula IV.

In the process according to the invention for making compounds of formula (I) (scheme 5), examples of suitable bases are alkali metal hydroxides or alkali metal carbonates. Examples which may be mentioned are sodium hydroxide, sodium carbonate, lithium hydroxide, potassium hydroxide, and potassium carbonate; preferably an alkali metal carbonate, more preferably sodium or potassium carbonate.

In the process according to the invention of making compounds of formula (I) (scheme 5), examples of appropriate solvents (or diluents) are those having a dielectric constant less than 15; more preferably, solvents (or diluents) having a dielectric constant less than 12; even more preferably, solvents (or diluents) having a dielectric constant less than 10. In another embodiment, the appropriate solvents (or diluents) have a dielectric constant less than 6. Examples of appropriate solvents (or diluents) are dioxane, tetrahydrofuran, 2-methyltetrahydrofuran, toluene, anisole, pyridine, acetone, methyl isobutyl ketone, ethyl acetate, t-butanol, eucalyptol; more preferably unpolar organic solvents chosen from dioxane, 2-methyltetrahydrofuran or tetrahydrofuran; most preferably appropriate solvents are those with a dielectric constant in the range from 1.5 to 15.

In one embodiment, in the process according to the invention of making compounds of formula (I) (scheme 5), the reaction is advantageously carried out in a temperature range from approximately 0° C. to approximately +100° C., preferably from approximately 0° C. to approximately +50° C., in many cases in the range between ambient temperature and approximately +40° C. In a preferred embodiment, the reaction is carried out at ambient temperature.

In one preferred embodiment, the present invention provides highly selective thiolation reactions of 3,5-dichloropicolinic amide compounds of formula (III) wherein $R_1$ is as defined in formula I under scalable conditions using sodium ethanethiolate or ethanethiol and a base in a selected protic or non-protic apolar solvent having a dielectric constant less than 15, producing (e.g. alkyl or other moiety corresponding to $R_1$) 5-chloro-3-ethylsulfanyl-pyridine-2-carboxamide intermediates of formula (IV).

(IV)

wherein $R_1$, including any of the preferred embodiments of $R_1$, is as defined above.

PREPARATORY EXAMPLES

Purity of starting materials and products was determined with quantitative $^1$H NMR using 1,3,5-trimethoxy benzene as an internal standard.

Example 1: Preparation of 5-Chloro-3-Ethylsulfanyl-Pyridine-2-Carboxamide

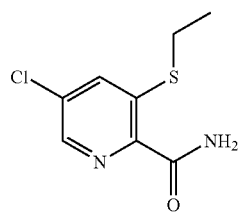

3,5-dichloropyridine-2-carboxamide (6.50 g, 95% purity, 32.5 mmol) and EtSNa (3.33 g, 82% purity, 32.5 mmol) were suspended in MeTHF (100 ml) and the light brown suspension was stirred at ambient temperature. Extra amount of EtSNa (2×0.167 g, 82% purity, 1.62 mmol) was added after 2 and 4 h of reaction time. After a total reaction time of 5 h the reaction solution was extracted with water (50 ml), aqueous phase was extracted with EtOAc (2×50 ml) and the combined organic layers were washed with brine, dried over anhydrous MgSO$_4$ and evaporated under reduced pressure. Drying under high vacuum provided 5-chloro-3-ethylsulfanyl-pyridine-2-carboxamide (7.36 g, 94% purity, 97% yield) as a white powder.

$^1$H NMR (400 MHz, DMSO-d6) δ ppm 8.35 (d, J=2.2 Hz, 1H), 8.01 (br s, 1H), 7.85 (d, J=2.2 Hz, 1H), 7.61 (br s, 1H), 2.93 (q, J=7.3 Hz, 2H), 1.25 (t, J=7.3 Hz, 3H)

Example 1a: Alternative Procedure for Preparation of 5-Chloro-3-Ethylsulfanyl-Pyridine-2-Carboxamide A 1 L double jacketed glass reactor with an overhead stirrer was charged with 3,5-dichloropyridine-2-carboxamide (100.0 g, 0.52 mol) and Me-THF (400 g). The solids dissolved upon stirring to afford a homogenous colorless solution. Solid NaOH (31.5 g, 0.79 mol) was added in a single portion. To this suspension ethanethiol (32.5 g, 0.52 mol) was added dropwise over 40 min, as addition is exothermic cooling was applied to maintain Ti=25° C. After full addition, mixture was stirred at Ti=25° C. for 90 min and then heated to Ti=65° C. for 120 min. After this period full completion was attained, water (100 g) was added and the biphasic mixture stirred for 10 min at Ti=65° C. Phases were separated and organic layer was washed with water (2×60 g) at Ti=65° C. Organic phase was partially concentrated by distilling off 250 g of solvent. Antisolvent methylcyclohexane (150 g) was added at Ti=65° C. and the homogenous mixture was cooled to Ti=25° C. over 60 min. During the cooling product started to crystallize from the solution.

Solids were filtered, washed with 2×50 g of methylcyclohexane and dried under reduced pressure to afford 5-chloro-3-ethylsulfanyl-pyridine-2-carboxamide (96 g, 80% yield) as a white solid.

Example 2: Solvent Screening for Preparation of 5-Chloro-3-Ethylsulfanyl-Pyridine-2-Carboxamide

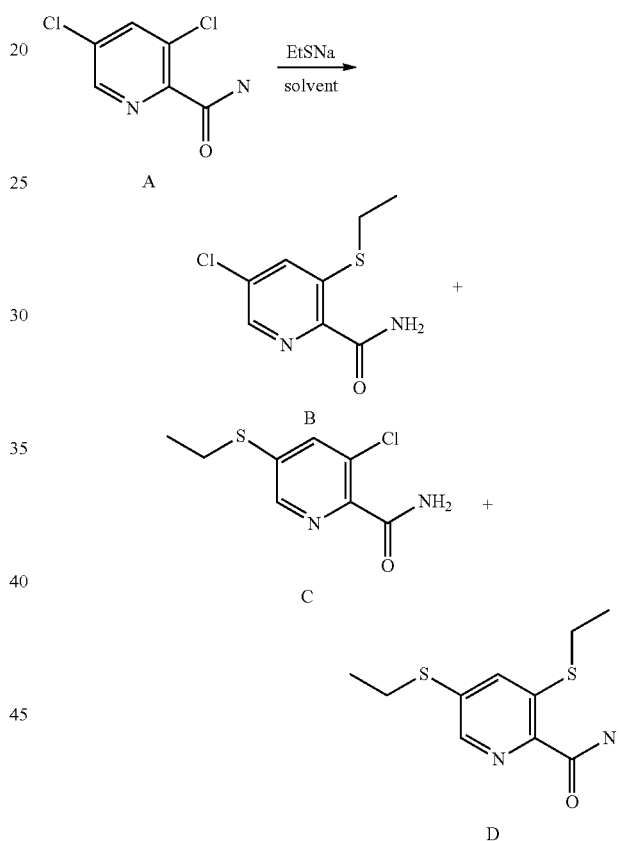

3,5-dichloropyridine-2-carboxamide (50-100 mg) and NaSEt (1.1 eq) were suspended/dissolved in a given solvent and stirred for 5 h at ambient temperature. The reaction mixture was then diluted with EtOAc, washed with water and brine, organic layer dried over anhydrous MgSO$_4$ and evaporated under reduced pressure. The resulting crude mixture was analyzed by $^1$H NMR giving the product ratios shown in the table below.

| Solvent | A | B | C | D |
|---|---|---|---|---|
| MeTHF | 1 | 98 | 0 | 1 |
| NMP | 26 | 29 | 12 | 33 |
| DMF | 39 | 33 | 14 | 14 |
| Pyridine | 16 | 75 | 7 | 2 |

-continued

| Solvent | A | B | C | D |
|---------|------|----|-----|---|
| Anisole | 22 | 75 | 3 | 0 |
| Dioxane | 22.5 | 75 | 2.5 | 0 |

Example 3: Preparation of 5-Chloro-3-Ethylsulfanyl-Pyridine-2-Carboxylic Acid

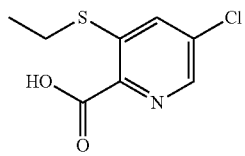

5-chloro-3-ethylsulfanyl-pyridine-2-carboxamide (0.500 g, 95% purity, 2.19 mmol) was suspended in aqueous 3M NaOH (3.3 ml, 6.6 mmol) and the resulting mixture was heated at 100° C. for 20 h. The reaction mixture was cooled to ambient temperature and acidified to ca pH 3 with 2M HCl. The resulting precipitate was filtered off, washed on filter with cold water and dried under high vacuum to yield 5-chloro-3-ethylsulfanyl-pyridine-2-carboxylic acid (0.505 g, 91% purity, 96% yield) as a slightly pink powder.

$^1$H NMR (400 MHz, DMSO-d6) δ ppm 8.44 (s, 1H), 7.95 (d, J=2.2 Hz, 1H), 3.14 (q, J=7.1 Hz, 2H), 1.26 (t, J=7.1 Hz, 3H)

Example 4: Preparation of 5-Chloro-N-Ethyl-3-Ethylsulfanyl-Pyridine-2-Carboxamide

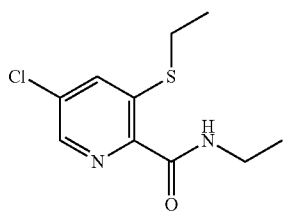

To a solution of 3,5-dichloro-N-ethyl-pyridine-2-carboxamide (0.100 g, 0.456 mmol) in THF (1.4 ml) was added NaSEt (0.052 g, 82% purity, 0.502 mmol) and the resulting suspension was stirred at rt for 3 h. The reaction mixture was diluted with EtOAc, washed with water and brine. The organic layer was dried over anhydrous MgSO₄ and evaporated under reduced pressure to yield 5-chloro-N-ethyl-3-ethylsulfanyl-pyridine-2-carboxamide (0.103 g, 80% purity, 75% yield) as an off-white powder. About 3% of undesired isomer was also detected in addition to ca 15% unreacted starting material.

$^1$H NMR (400 MHz, CDC$_3$) δ ppm 8.17 (d, J=1.8 Hz, 1H), 7.87 (br s, 1H), 7.59 (d, J=1.8 Hz, 1H), 3.52-3.43 (m, 2H), 2.88 (q, J=7.5 Hz, 2H), 1.42 (t, J=7.3 Hz, 3H), 1.25 (t, J=7.3 Hz, 3H)

Example 5: Preparation of 5-Chloro-3-Ethylsulfanyl-N-Phenyl-Pyridine-2-Carboxamide

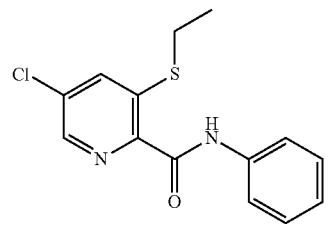 [SMILES: CCSc1cc(Cl)cnc1C(=O)Nc1ccccc1]

To a solution of 3,5-dichloro-N-phenyl-pyridine-2-carboxamide (0.100 g, 0.374 mmol) in THF (1.2 ml) was added NaSEt (0.042 g, 82% purity, 0.412 mmol) and the resulting suspension was stirred at rt for 3 h. The reaction mixture was diluted with EtOAc, washed with water and brine. The organic layer was dried over anhydrous MgSO₄ and evaporated under reduced pressure to yield 5-chloro-3-ethylsulfanyl-N-phenyl-pyridine-2-carboxamide (0.096 g, 83% purity, 73% yield) as an orange solid. About 10% of unreacted starting material, but none of the undesired isomers, were also detected.

$^1$H NMR (400 MHz, CDC$_3$) δ ppm 9.92 (br s, 1H), 8.26 (d, J=1.8 Hz, 1H), 7.80-7.75 (m, 2H), 7.66 (d, J=1.8 Hz, 1H), 7.41-7.35 (m, 2H), 7.17-7.12 (m, 1H), 2.94 (q, J=7.3 Hz, 2H), 1.46 (t, J=7.3 Hz, 3H)

Example 6: Preparation of 5-Chloro-N-Cyclopentyl-3-Ethylsulfanyl-Pyridine-2-Carboxamide

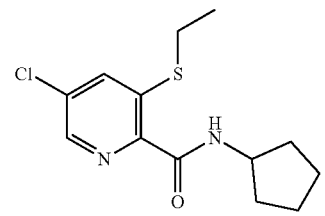 [SMILES: CCSc1cc(Cl)cnc1C(=O)NC1CCCC1]

To a solution of 3,5-dichloro-N-cyclopentyl-pyridine-2-carboxamide (0.100 g, 0.386 mmol) in THF (1.2 ml) was added NaSEt (0.044 g, 82% purity, 0.43 mmol) and the resulting suspension was stirred at rt for 3 h. The reaction mixture was diluted with EtOAc, washed with water and brine. The organic layer was dried over anhydrous MgSO₄ and evaporated under reduced pressure to yield 5-chloro-N-cyclopentyl-3-ethylsulfanyl-pyridine-2-carboxamide (0.091 g, 87% purity, 72% yield) as an orange solid. About 10% of unreacted starting material, but none of the undesired isomers, were also detected.

$^1$H NMR (400 MHz, CDC$_3$) δ ppm 8.16 (d, J=2.2 Hz, 1H), 7.85 (br s, 1H), 7.58 (d, J=2.2 Hz, 1H), 4.41-4.30 (m, 1H), 2.88 (q, J=7.3 Hz, 2H), 2.13-2.02 (m, 2H), 1.79-1.49 (m, 6H), 1.42 (t, J=7.3 Hz, 3H)

Example 7: Preparation of 5-Chloro-3-Ethylsulfanyl-N-(2-Hydroxyethyl)Pyridine-2-Carboxamide

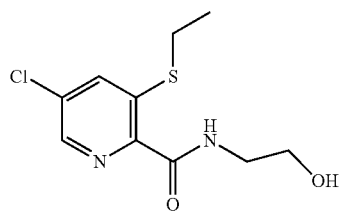 [SMILES: CCSc1cc(Cl)cnc1C(=O)NCCO]

To a solution of 3,5-dichloro-N-(2-hydroxyethyl)pyridine-2-carboxamide (0.100 g, 93% purity, 0.396 mmol) in THF (1.2 ml) was added NaSEt (0.045 g, 82% purity, 0.44 mmol) and the resulting suspension was stirred at rt for 3 h. The reaction mixture was diluted with EtOAc, washed with water and brine. The organic layer was dried over anhydrous MgSO$_4$ and evaporated under reduced pressure to yield 5-chloro-3-ethylsulfanyl-N-(2-hydroxyethyl)pyridine-2-carboxamide (0.084 g, 82% purity, 67% yield) as an orange solid. About 1% of undesired isomer was also detected in addition to 11% unreacted starting material.

$^1$H NMR (400 MHz, CDCl$_3$) δ ppm 8.28 (br s, 1H), 8.19 (d, J=1.8 Hz, 1H), 7.60 (d, J=1.8 Hz, 1H), 3.87-3.81 (m, 2H), 3.66-3.59 (m, 2H), 2.90 (q, J=7.3 Hz, 2H), 2.38 (br s, 1H), 1.43 (t, J=7.3 Hz, 3H)

Example 8: Preparation of 5-Chloro-3-Ethylsulfanyl-N-[2-(Methylamino)-5-(Trifluoromethyl)-3-Pyridyl]pyridine-2-Carboxamide

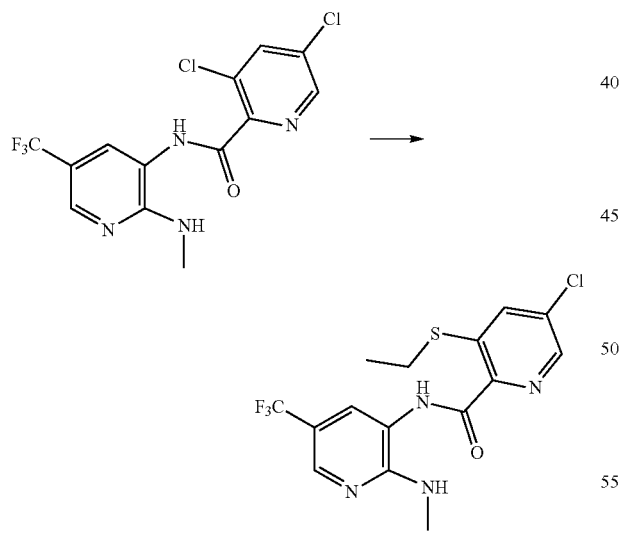

3,5-dichloro-N-[2-(methylamino)-5-(trifluoromethyl)-3-pyridyl]pyridine-2-carboxamide (1.500 g, 94% purity, 3.85 mmol) was dissolved in THF (15.4 ml) and EtSNa (0.647 g, 80% purity, 6.15 mmol) was added to the mixture. The reaction was stirred 1 h15 min at 65° C. (brownish solution), then at room temperature overnight. It was then quenched with water (10 ml), diluted with EtOAc (20 ml), the phases were separated, and the aqueous phase was extracted twice with EtOAc (2×20 ml). The combined organic layers were then washed with brine (2×20 ml), dried over solid Na$_2$SO$_4$, filtered and the solvents were evaporated yielding a crude product (1.5595 g, purity 90%, chemical yield 94%). The crude was then purified by column chromatography, yielding 5-chloro-3-ethylsulfanyl-N-[2-(methylamino)-5-(trifluoromethyl)-3-pyridyl]pyridine-2-carboxamide (1.396 g purity 93%, isolated yield 91%) as a yellow solid.

$^1$H NMR (400 MHz, CDCl$_3$) δ ppm 9.47 (s, 1H), 8.35 (d, J=2.2 Hz, 1H), 8.27 (d, J=2.2 Hz, 1H), 7.93 (d, J=2.2 Hz, 1H), 7.68 (d, J=2.2 Hz, 1H), 5.05 (bd, J=4.4 Hz, 1H), 5.05 (bd, J=4.4 Hz, 1H), 3.09 (d, J=5.1 Hz, 3H), 2.95 (q, J=7.4 Hz, 2H), 1.46 (t, J=7.4 Hz, 3H),

The invention claimed is:

1. A process for the preparation of a 5-chloro pyridine-2-carboxylic acid amide of formula I:

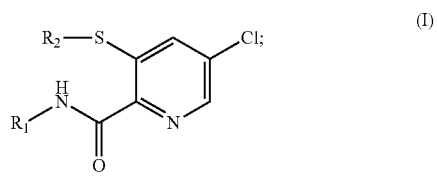

wherein R$_1$ is hydrogen, C$_1$-C$_4$alkyl, C$_1$-C$_4$hydroxyalkyl, C$_3$-C$_7$cycloalkyl, aryl or optionally substituted heteroaryl; and R$_2$ is C$_1$-C$_4$alkyl; or an agrochemically acceptable salt of a compound of formula (I);

which process comprises:

reacting a compound of formula (III)

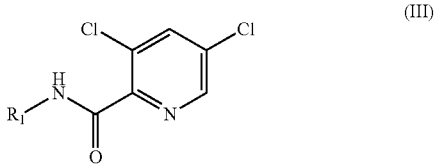

wherein R$_1$ is as defined in formula (I);
with a thiol compound R$_4$—S—R$_2$, wherein R$_2$ is as defined in formula (I) and R$_4$ is H or an alkali metal ion; in the presence of a suitable base, in an appropriate solvent or diluent having a dielectric constant less than 15;
to produce a compound of formula (I) or a salt thereof and, optionally,
hydrolyzing the compound of the formula (I) or a salt thereof under either basic or acidic conditions; to produce a compound of formula (II)

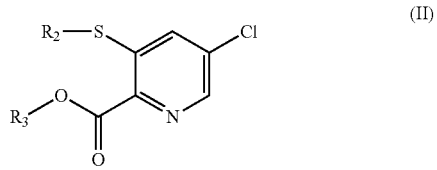

where R$_2$ is as defined in formula (I) and R$_3$ is hydrogen, sodium, potassium or lithium.

2. The process according to claim 1, wherein R$_1$ is hydrogen, C$_1$-C$_2$alkyl, C$_1$-C$_2$hydroxyalkyl, C$_3$-C$_5$cycloalkyl, phenyl, pyridyl, or pyridyl which can be mono- or disubstituted by amino, methylamino or trifluoromethyl and $R_2$ is $C_1$-$C_2$alkyl.

3. The process according to claim 1, wherein the suitable base is selected from an alkali metal carbonate or an alkali metal hydroxide.

4. The process according to claim 1, wherein the appropriate solvent or diluent is selected from those with a dielectric constant in the range from about 1.5 to about 15.

5. The process according to claim 4, wherein the appropriate solvent or diluent is selected from dioxane, THF, methyltetrahydrofuran, toluene, anisole, pyridine, acetone, methylisobutyl ketone, tBuOH.

6. The process according to claim 1, wherein the process is carried out in a temperature range of 0° C. to 1000° C.

7. The process according to claim 6, wherein the process is carried out at an ambient temperature.

8. A compound of formula (IV):

(IV)

wherein $R_1$ is hydrogen, $C_1$-$C_2$alkyl, $C_1$-$C_2$hydroxyalkyl, $C_3$-$C_5$cycloalkyl, phenyl, pyridyl, or pyridyl which can be mono- or disubstituted by amino, methylamino or trifluoromethyl; or an agrochemically acceptable salt of a compound of IV.

9. The compound according to claim 8, wherein $R_1$ is hydrogen, ethyl, hydroxyethyl, cyclopentyl, phenyl, pyridyl, or pyridyl disubstituted by amino, methylamino or trifluoromethyl.

10. A compound according to claim 8, wherein $R_1$ is hydrogen, methyl, ethyl, phenyl, cyclopropyl, cyclopentyl, hydroxymethyl, hydroxyethyl, pyridyl or 2-(methylamino)-5-(trifluoromethyl)-3-pyridyl.

11. The process according to claim 1, wherein $R_1$ is methyl or hydrogen and $R_2$ is ethyl.

12. The process according to claim 1, wherein the compound of formula (I) is
  5-chloro-3-ethylsulfanyl-pyridine-2-carboxamide;
  5-chloro-N-ethyl-3-ethylsulfanyl-pyridine-2-carboxamide;
  5-chloro-3-ethylsulfanyl-N-phenyl-pyridine-2-carboxamide;
  5-chloro-N-cyclopentyl-3-ethylsulfanyl-pyridine-2-carboxamide;
  5-chloro-3-ethylsulfanyl-N-(2-hydroxyethyl)pyridine-2-carboxamide; or
  5-chloro-3-ethylsulfanyl-N-[2-(methylamino)-5-(trifluoromethyl)-3-pyridyl]pyridine-2-carboxamide.

13. The process according to claim 1, wherein the compound of formula (III) is
  3,5-dichloropyridine-2-carboxamide;
  3,5-dichloro-N-ethyl-pyridine-2-carboxamide;
  3,5-dichloro-N-cyclopentyl-pyridine-2-carboxamide;
  3,5-dichloro-N-(2-hydroxyethyl)pyridine-2-carboxamide; or
  3,5-dichloro-N-[2-(methylamino)-5-(trifluoromethyl)-3-pyridyl]pyridine-2-carboxamide.

14. The process according to claim 1, wherein the thiol compound is EtSNa.

15. The process according to claim 1, wherein the compound of formula (II) is 5-chloro-3-ethylsulfanyl-pyridine-2-carboxylic acid.

16. The process according to claim 1, wherein the suitable base is sodium carbonate, potassium carbonate or sodium hydroxide.

17. The process according to claim 1, wherein the suitable base is sodium hydroxide.

18. The process according to claim 4, wherein the appropriate solvent or diluent is selected from dioxane, methyltetrahydrofuran or methylisobutyl ketone.

19. The process according to claim 1, wherein the process is carried out in a temperature range of about 0° C. to about 50° C.

20. The compound according to claim 8, wherein $R_1$ is hydrogen, ethyl, phenyl, cyclopentyl, hydroxyethyl, or 2-(methylamino)-5-(trifluoromethyl)-3-pyridyl.

* * * * *